United States Patent [19]

Lander et al.

[11] Patent Number: 5,346,246
[45] Date of Patent: Sep. 13, 1994

[54] AUTOMATIC AIR BAG SUSPENSION CONTROL SYSTEM

[75] Inventors: Cecil Lander; Alex Khaykin, both of Pittsburgh, Pa.

[73] Assignee: Load-Air, Inc., Carnegie, Pa.

[21] Appl. No.: 980,507

[22] Filed: Nov. 23, 1992

[51] Int. Cl.⁵ ............................................. B60G 11/26
[52] U.S. Cl. .................... 280/711; 267/64.28; 280/714
[58] Field of Search ............... 280/711, 714, 6.12, 280/702; 267/64.28

[56] References Cited

U.S. PATENT DOCUMENTS

| | | | |
|---|---|---|---|
| 2,862,725 | 12/1958 | Jackson | 280/124 |
| 2,947,547 | 8/1960 | Gouirand | 280/711 |
| 3,145,032 | 8/1964 | Turek | 280/124 |
| 3,214,185 | 10/1965 | Mason et al. | 280/711 |
| 3,214,188 | 10/1965 | Alfieri | 280/124 |
| 3,966,223 | 6/1976 | Carr | 280/712 |
| 4,033,607 | 7/1977 | Cameron | 280/711 |
| 4,033,608 | 7/1977 | Sweet et al. | 280/711 |
| 4,206,934 | 6/1980 | McKee | 280/711 |
| 4,379,572 | 4/1983 | Hedenberg | 280/711 |
| 4,453,736 | 6/1984 | Bergemann et al. | 280/711 |
| 4,553,773 | 11/1985 | Pierce | 280/676 |
| 4,603,843 | 8/1986 | Bechu | 267/35 |
| 4,619,467 | 10/1986 | Lafferty | 280/708 |
| 4,761,020 | 8/1988 | Eckel et al. | 280/711 |
| 4,871,189 | 10/1989 | Van Breemen | 280/711 |
| 4,903,984 | 2/1990 | Kajiwara et al. | 280/712 |
| 4,998,749 | 3/1991 | Bockewitz | 280/712 |
| 5,052,713 | 10/1991 | Corey et al. | 280/711 |

FOREIGN PATENT DOCUMENTS 629093 12/1961 Italy ..................... 280/711

OTHER PUBLICATIONS

Load-Air, Inc. "Load-Air ® for Low-Cost Air Ride Comfort", P10-1047, Oct. 1, 1990.
Load-Air, Inc. "New Model Load-Air ® Front End Kit for Greater Driver Comfort", Model P10-113-952, P10-1054-5M 7/91-SP.
Load-Air, Inc. "Air Bag System for Spring Suspensions", Model P10-103, P10-1042-5M, 7/91-SP.
Sauer Products, Inc., "Air Bag System for Spring Suspensions", Model P10-105/111, P10-1043, Feb. 2, 1991.
Sauer Products, Inc., "Load-Air ® Pro-Par ® Kit for Low-Cost Air Ride Comfort".

Primary Examiner—Eric D. Culbreth
Attorney, Agent, or Firm—Webb Ziesenheim Bruening Logdson Orkin & Hanson

[57] ABSTRACT

A vehicle energy absorbing system for a vehicle having a suspension system, a frame and an axle, wherein the frame is spaced apart from the axle in a vertical direction and the suspension system mechanically couples the frame to the axle. The system includes an expandable air bag mechanically coupled to the frame and to the axle, a distance indicator for indicating a vertical distance between the frame and the axle attached to the vehicle, an air bag pressure control valve fluidly connected to the air bag and coupled to the distance indicator, and a source of air under pressure attached to the vehicle and fluidly coupled to the air bag pressure control valve through a control panel. When the indicator indicates a first distance between the frame and the axle, the valve is positioned in a first position supplying air from the source of air to the air bag at a first air pressure, and when the indicator indicates a second distance between the frame and the axle, the valve is positioned in a second position supplying air from the source of air to the air bag at a second air pressure.

22 Claims, 3 Drawing Sheets

AUTOMATIC AIR BAG SUSPENSION CONTROL SYSTEM

BACKGROUND OF THE INVENTION

1. Field of the Invention

This invention relates to stabilized vehicles and, more particularly, to air bag energy absorbing systems for trucks, tractors and trailers equipped with spring or walking beam suspensions.

2. Description of the Prior Art

Air bag energy absorbing systems for trucks, tractors and trailers equipped with spring or walking beam suspensions effectively reduce road shocks transmitted through the tires, axles and suspension into the vehicle body; smooth out uneven road conditions; significantly reduce axle hop, bogie chatter and cargo damage; and provide air ride performance from the spring suspension. U.S. Pat. No. 4,033,607 to Cameron, the disclosure of which is hereby incorporated by reference, discloses such an air bag energy absorbing system. Air bag energy absorption systems cost less and are more reliable than the air suspension systems disclosed in the following U.S. Pat. Nos.: 2,862,725; 3,145,032; 3,214,188; 3,966,223; 4,033,607; 4,206,934; 4,453,736; 4,553,773; 4,603,843; 4,619,467; 4,871,189; 4,903,984; 4,998,749 and 5,052,713.

The Load-Air ™ system, manufactured by Load-Air, Inc. of 730 Superior Street, Carnegie, Pa. 15106, assignee of the Cameron patent, is made in accordance with the teachings of the Cameron patent. The Load-Air ™ system includes two air bags supported from a seat attached to an axle of a vehicle, and a cross member attached to a vehicle frame. The suspension system carries the load and the Load-Air ™ system absorbs the impact energy and provides a dampening effect on any axle upward thrust before it is transmitted to the vehicle.

Air is supplied at a constant pressure from the vehicle's air system to the air bags. The pressure of the air supplied to the bags is manually controlled by the vehicle operator. Generally, a low pressure is used for a vehicle in an unloaded condition and a high pressure is used for a vehicle in a loaded condition. However, it is not uncommon for a vehicle operator to fail to manually adjust the air bag pressure to correspond with a respective load condition or change in load condition, i.e. the air pressure is maintained at a level appropriate to a loaded condition even if the vehicle is in an unloaded condition. This can result in an uncomfortable ride for the vehicle operator and accelerated wear of a number of the vehicle components.

Therefore, it is an object of the present invention to provide an air bag energy absorbing system for a vehicle that automatically adjusts the air bag pressure as a function of the loaded condition of the vehicle.

SUMMARY OF THE INVENTION

We have invented an energy absorbing system for a vehicle having a suspension system, a frame and an axle, wherein the frame is spaced apart from the axle in a vertical direction and the suspension system mechanically couples the frame to the axle. Our energy absorbing system can be utilized on single-axle or multi-axle vehicles. The vehicle energy absorbing system includes expandable air bags mechanically coupled to the frame and the axle, a vertical distance indicator for indicating a vertical distance between the frame and the axle attached to the vehicle, an air bag pressure control valve fluidly connected to the air bag and coupled to the vertical distance indicator, a control panel and a source of air under pressure attached to the vehicle and fluidly coupled to the air bag pressure control. The air bag pressure control valve can be a pilot valve. When the vertical indicator indicates a first vertical distance between the frame and the axle, the valve is positioned in a first position supplying air from the source of air to the air bag at a first air pressure. When the vertical indicator indicates a second vertical distance between the frame and the axle, the valve is positioned in a second position supplying air from the source of air to the air bag at a second air pressure.

The vertical distance indicator can include a U-shaped member having a base and a guiding member attached to the base and a U-shaped guided member having a leg and a top member where the leg is slidably received by the guiding member. A spring is located between the base and the top member of the guided member, so that the guided member is adapted to move in the vertical direction relative to the base. The guiding member can include a roller arrangement for assisting the guided member. A stop arrangement can be attached to the guiding member.

The pilot valve can include a wheel pivotally mounted to an arm where the wheel rests on a top member of the guiding member.

Our invention also includes a kit for modifying a vehicle having the above-described suspension system and air bags. The kit includes the vertical distance indicator and an air bag pressure control valve.

Further, our invention includes a method for absorbing energy of a vehicle having the above-described suspension system including the step of determining a distance indicative of the vertical distance between the frame and the axle, inflating the expandable air bag to a first pressure if the distance is greater than or equal to a first value and inflating the expandable air bag to a second pressure if the distance is less than the first value.

DESCRIPTION OF THE PREFERRED EMBODIMENT

Figure 1:
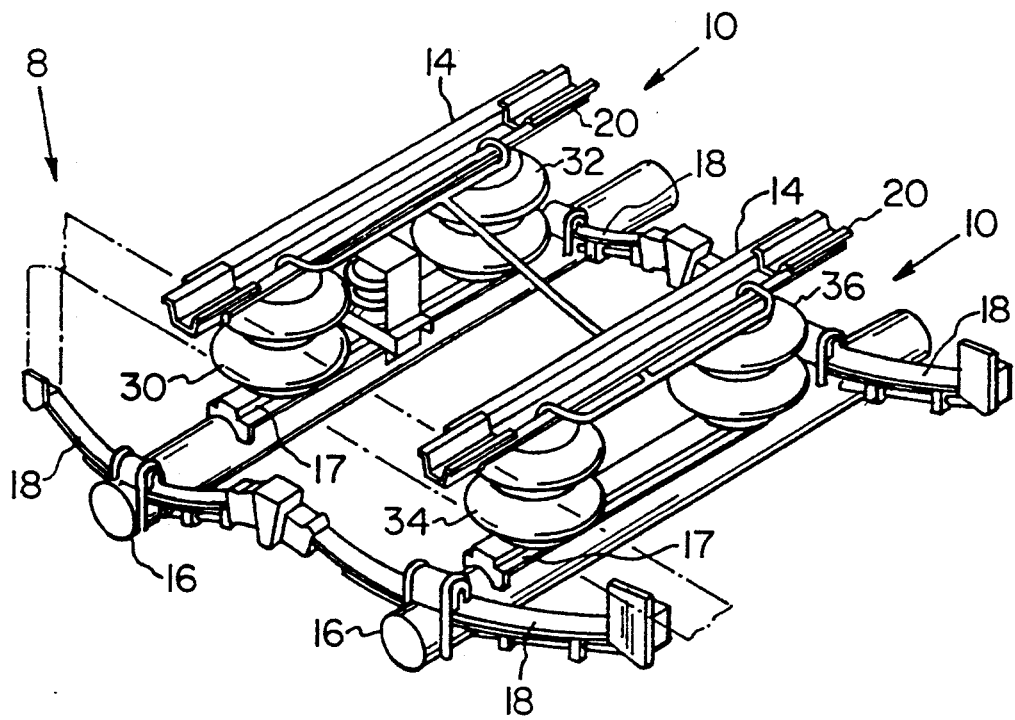
FIG. 1 is a top perspective view of a portion of a truck suspension system incorporating an air bag energy absorbing system in accordance with the present invention.

FIG. 1 shows a portion of a vehicle 8, such as a tractor, trailer, semi-trailer or truck, incorporating an energy absorbing system 10 made in accordance with the present invention. The vehicle 8 which is a tandem axle unit and which includes a subframe (not shown) also includes two frame cross members 14 and two axle arrangements 16, which are well-known in the art. A seat 17 is attached, preferably by welding, to each axle arrangement 16. The bags 30, 32, 34 and 36 need not be attached to the seat 17 directly over the axle arrangement 16, but can be positioned forwardly or rearwardly of the axle arrangement 16. The seat 17 can also be attached to axle arrangements 16 by a U-bolt arrangement. These air bag seat arrangements are known in the art. Leaf springs 18 are attached to and couple the axle arrangements 16 and the subframe as is well-known in the art.

Two adjustable brackets 20 are attached, preferably by welding, to each of the cross members 14 and the subframe. Expandable air bags 30, 32, 34 and 36 are attached to respective seats 17 and cross members 14 so that a pair of air bags 30 and 32 are provided per axle, and are thereby mechanically coupled to the subframe and axle arrangement 16. Each air bag pair is spaced between a respective cross member 14 and axle arrangement 16 and each air bag is spaced a distance apart from the other air bags.

Figure 2:
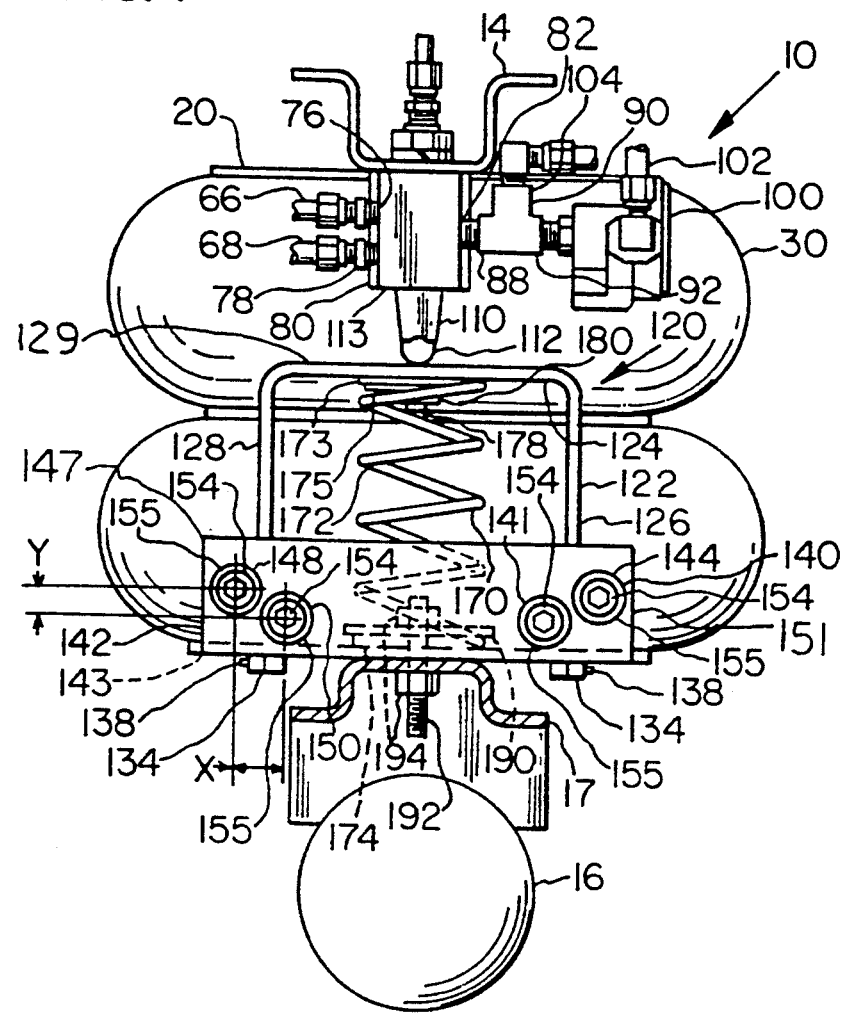
FIG. 2 is a side view of a portion of the energy absorbing system shown in FIG. 1.
Figure 3:
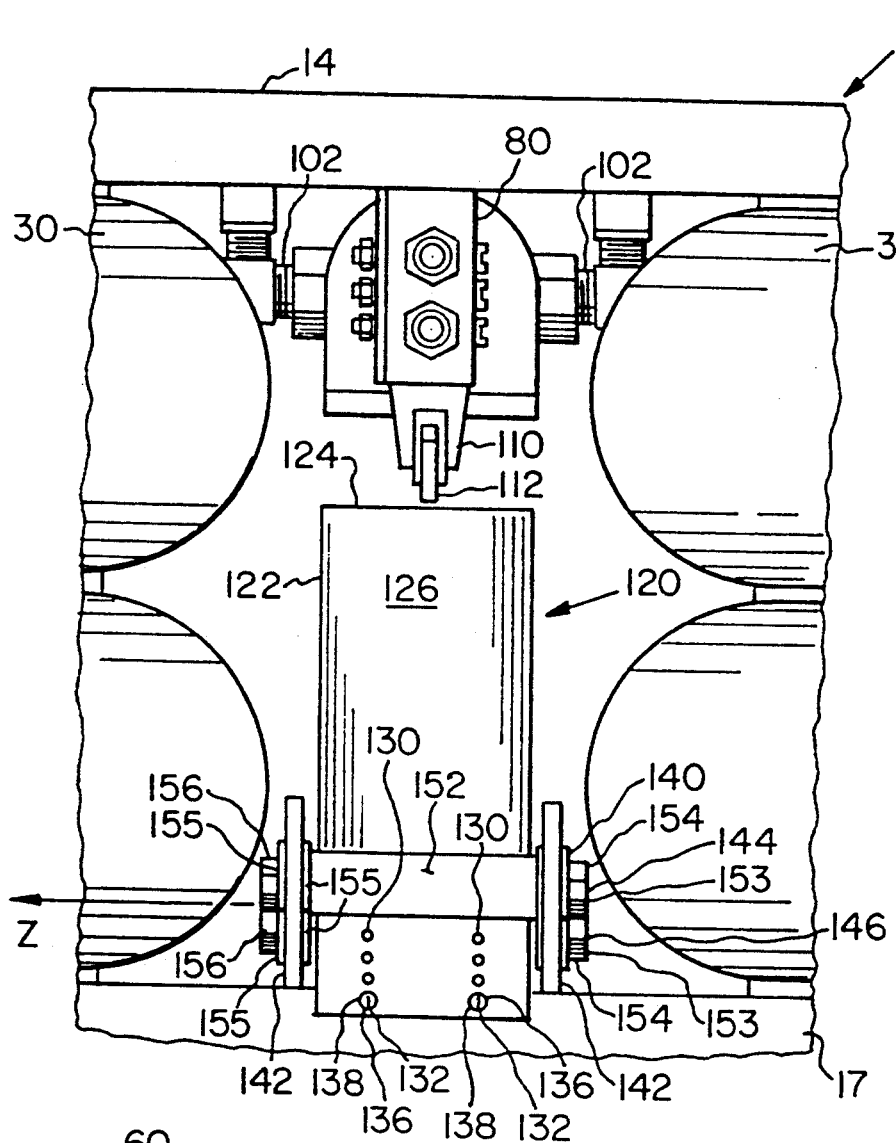
FIG. 3 is a side view of a portion of the energy absorbing system made in accordance with the present invention.
Figure 4:
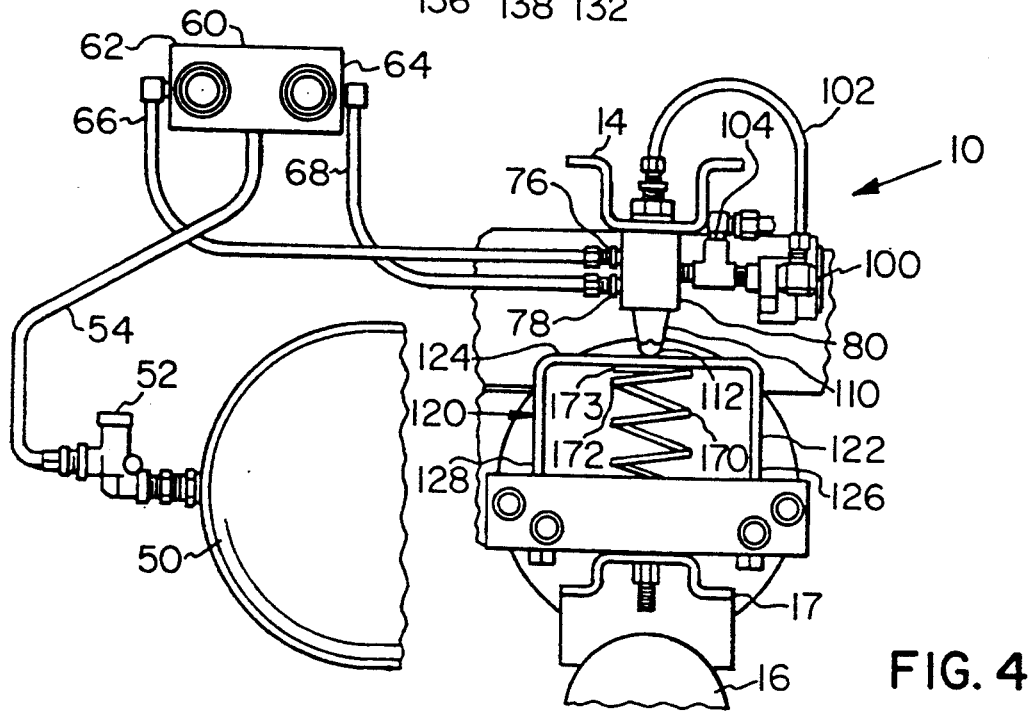
FIG. 4 is a side view of a pneumatic system of the energy absorbing system made in accordance with the present invention.

Referring now to FIGS. 2–4, the energy absorbing system 10 further includes an air tank 50 fluidly connected to a protection valve 52, such as a brake protection valve. As used herein, the terms "fluid communication", "fluidly coupled" and "fluidly connected" are interchangeable. Generally, the air tanks are included with the vehicle 8 and are a source of pressurized air. The protection valve 52, which is well-known in the art, prevents pressure from exiting the tank 50 below a minimum value. A line 54 fluidly connects the protection valve 52 to a control panel 60 attached to the vehicle at any convenient location such as to a front cross member of the subframe.

The control panel 60 includes a pre-set high pressure regulator 62 and a pre-set low pressure regulator 64. Line 54 is fluidly connected to a plenum chamber (not shown) in the control panel 60 that is fluidly connected to regulators 62 and 64. Preferably, regulator 62 has a range of 0–30 psig and most preferably is pre-set at 15 psig; and regulator 64 has a range of 0–15 psig and most preferably is pre-set at 7 ½ psig. Each regulator 62 and 64 can include a built-in maximum pressure limiter that is set at about 1–2 psig higher than the maximum pressure range of the respective regulator. Two lines 66 and 68 exit the control panel 60 to respective inlet ports 76 and 78 of a load sensing valve 80. Line 66 is fluidly connected to regulator 62 and line 68 is fluidly connected to regulator 64. The load sensing valve 80 is a Shrader Bellows, Model No. 52421 1000 or equal.

A first end 88 of a tee pipe connection 90 is fluidly connected to an outlet port 82 of the load sensing valve 80. A quick release valve 100 is fluidly connected to a second end 92 of the tee connection 90. The quick release valve 100, which is well-known in the art, is fluidly connected by lines 102 to bags 30 and 32, see FIG. 3. A third end 104 of the tee connection 90 is connected to a quick release valve (not shown), which is fluidly connected to air bags 34 and 36 on the next axle, in the same manner as previously described. The quick release valves permit excess air pressure to be relieved from respective air bags 30, 32, 34 and 36 when the vehicle 8 hits a bump.

The load sensing valve 80 includes a spring-loaded valve arm 110 and a valve roller 112 pivotally attached to one end of the arm 110 as shown in FIGS. 2–4. The roller 112 rests on a valve actuator 120. The valve actuator 120 acts as a vertical distance indicator in the Y direction between the cross member 14 and the axle seat 17.

The valve 80 fluidly couples the low pressure regulator 64 to the air bags 30–36 when the arm 110 is in an extended position ($X_o$). This is the neutral or normal position of the valve. However, when a compressive force of approximately 12.6 psi is applied to the arm 110 so that the arm moves upward and retracts approximately 0.312 inch to a retracted position ($X_1$) within a valve body 113, the valve 80 fluidly couples the high pressure regulator 62 to the air bags 30–36. This is the actuated position of the valve 80.

The valve actuator 120 includes a U-shaped guide member 122 having a top member 124 and two legs 126 and 128 depending therefrom. The roller 112 rests on an upper surface of the top member 124. A plurality of adjustment holes 130 are provided at the lower end of each of the legs 126 and 128. Stops 132 are attached to the bottom of the legs 126 and 128. Specifically, each stop 132 includes a rectangular block 134 having a hole and a screw 136 having a head 138 and a threaded shaft. The threaded shaft passes through a respective hole 130 and is threadably received by a nut (not shown). The respective leg 126 or 128 is sandwiched between the block 134 and the head 138.

A guiding member 140 slideably receives legs 126 and 128. The guiding member 140 includes two spaced rectangular guiding plates 142 positioned parallel to each other and attached at their lower ends to a flat base 143 by welding or the like. Alternatively, the guiding member may be a U-shaped bracket. The base 143 is positioned between plates 142 and is perpendicular thereto. The base 143 is attached to seat 17. Rolling members 144 and 146, which form a first rolling member set, are pivotally attached to a first side 147 of each plate 142. Rolling members 148 and 150, which form a second rolling member set, are pivotally attached to a second side 151 of each plate 142. Rolling member 144 is spaced in a vertical direction Y and a horizontal direction X from rolling member 146, and rolling member 148 is spaced in the vertical direction Y and the horizontal direction X from rolling member 150. Each rolling member 144, 146, 148 and 150 includes a hollow cylindrical shaped liner 152 disposed between the plates 142. The liner 152 is made from a plastic material, such as nylon or Teflon®. A shoulder bolt 153 having a head 154 and a threaded end passes through respective holes in plates 142 and the cylindrical liner 152. Each bolt 153 also receives washers 155 with two washers sandwiching each plate 142. A nut 156 is threadably received by the threaded shaft of bolt 153 so that the liner 152 is held in place and can rotate about a longitudinal axis Z. Other rolling member arrangements can be incorporated, e.g. utilizing the rollers on each side of the valve actuator to better stabilize the legs of the valve actuator.

The valve actuator 120 also includes a spring 170 having a plurality of coils 172 with an upper end coil 173 and a lower end coil 174. Preferably, the spring 170 is made from 17-7 pH stainless steel wire. It has a free length of 5.25 inches and a spring rate which will generate a force of 12.6 psi when compressed to 0.83 inch. The wire diameter and number of coils are selected to allow for a solid height of 0.98 inch which will allow for full up-axle travel under most conditions.

The spring 170 is connected to the top member 124 by locating its upper end coil 173 on a plate 175 attached to the top member 124. A plate 175 is welded to the top member 124 and coil spring 170 is held in place by a friction fit. The spring 170 is likewise attached to base 143 by locating the lower end coil 174 on a plate 190. A threaded bolt 192 passes through aligned holes in seat 17, base 143 and plate 190. A nut 194 is received on the end of bolt 192 thereby attaching the actuator 120 to the axle seat 17.

The energy absorbing system of the present invention operates as follows. When the vehicle 8 is in a loaded condition, the subframe and the cross member 14 move downwardly closer to the axle arrangement 16 than when the vehicle 8 is in an unloaded condition. Each vehicle axle can also move vertically relative to the subframe when the vehicle travels over bumps and potholes. However, the cross member 14 is typically spaced about 9.5 inches from the axle seat 17. The valve roller 112 and top member 124 arrangement ensures constant contact of the load sensing valve 80 and the valve actuator 120 when the vehicle 8 is in the loaded condition, regardless of the position of the cross member 14 with respect to the axle arrangement 16.

Figures 5, 6:
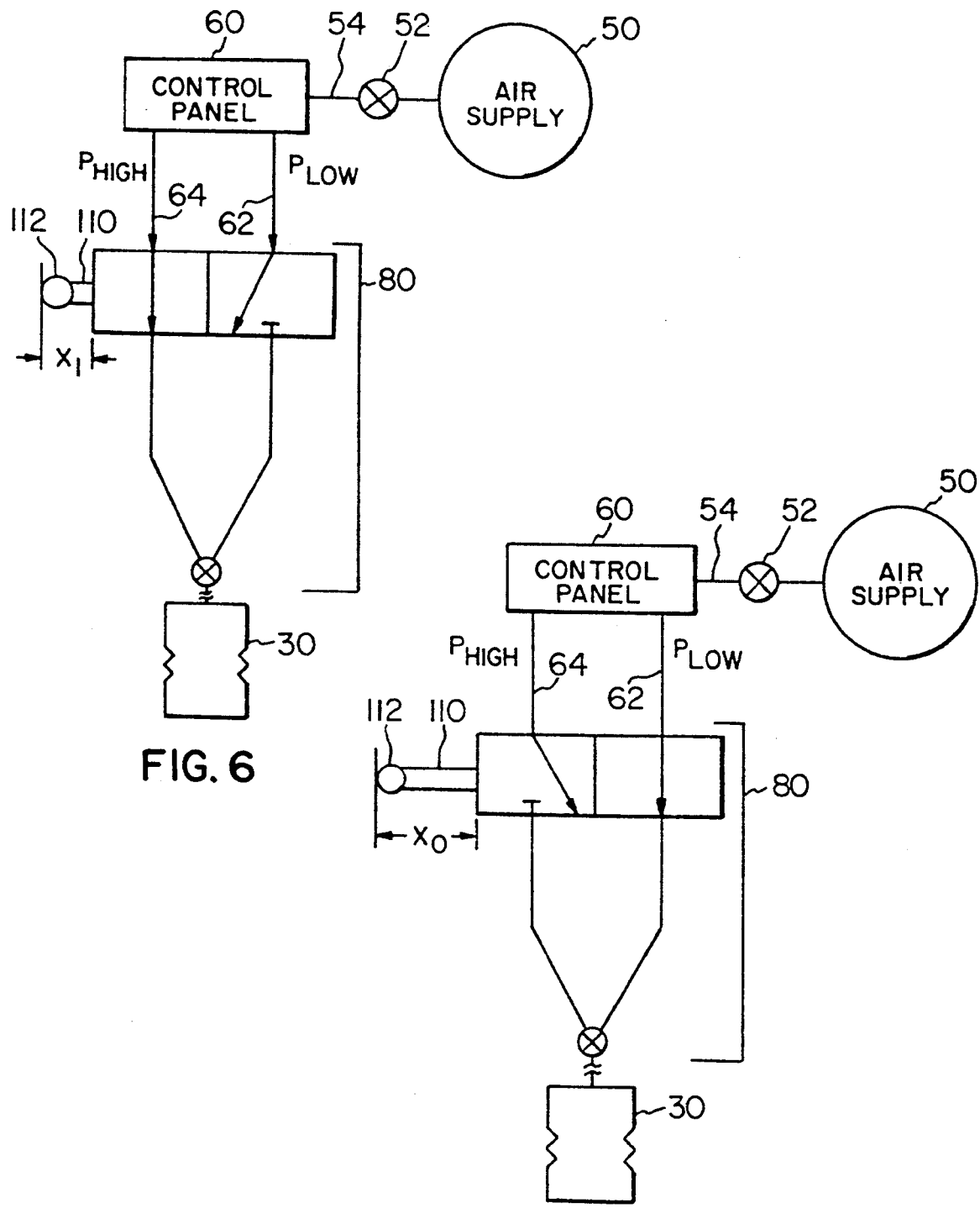
FIG. 5 is a schematic view of the pneumatic system shown in FIG. 4 for a vehicle in an unloaded condition.
FIG. 6 is a schematic view of the pneumatic system shown in FIG. 4 for a vehicle in a loaded condition.

When the vehicle 8 is in the unloaded condition, the cross member 14 and the axle arrangement are at their maximum distance apart in the vertical direction, on the order of about 9.5 inches, and the bags 30, 32, 34 and 36 are inflated at the lower pressure, as shown in FIG. 5. Thus, the bags 30, 32, 34 and 36 are fluidly coupled to or in fluid communication with the low pressure regulator 64 and are not fluidly coupled to the high pressure regulator 62. In a loaded condition, the cross member 14 generally moves closer to the axle arrangement. The distance moved is a function of the load and the vehicle suspension system and are generally in the range of 1.25–1.5 inches. In a preferred embodiment, when the cross member 14 moves 1.25 inches closer to the axle arrangement 16, the valve 80 is activated and the bags 30, 32, 34 and 36 are inflated to the higher pressure and the fluid circuit is such as shown in FIG. 6. Thus, the bags 30, 32, 34 and 36 are fluidly coupled to or in fluid communication with the high pressure regulator 62 and are not fluidly coupled to the low pressure regulator 64. Hence, the valve 80 acts as an air bag pressure control valve.

If the operator desires to inflate the air bags when the movement is less than 1.25 inches, then the minimum spacing between the top member 124 and the cross member 14 is decreased by installing a shim or spacer to the top of the axle seat 17 raising the guiding member 140. On the other hand, if the operator desires to inflate the air bags when the movement of the cross member 14 and the axle arrangement is greater than 1.25 inches, then the minimum spacing between the frame 14 and the top member can be increased by moving the stops 132 upwardly to different holes 130. The same result can also be achieved by modifying the spring constant of the spring 170.

It is important to note that the present invention does not attempt to maintain a constant spacing between the frame 14 and axle arrangement 16. The air bags 30, 32, 34 and 36 insignificantly affect this spacing. However, the air bags, depending on the load of the vehicle and the air bag pressure, significantly affect the smoothness of the ride because of the capability of the air bags to absorb energy and thereby reduce shock to the frame 14 transmitted through the tires.

Accordingly, the present invention automatically adjusts the air bag pressure as a function of the loaded condition and eliminates manual controls described in the Cameron patent.

In addition, the two pressure regulators 62 and 64 of the control panel can be re-adjusted to new set points to match a given trailer weight and anticipated load.

Having described the presently preferred embodiment of our invention, it is to be understood that it may otherwise be embodied within the scope of the appended claims.

We claim:

1. A vehicle energy absorbing system for a vehicle having a suspension system, a frame and an axle, wherein the frame is spaced apart from the axle in a vertical direction and the suspension system mechanically couples the frame to the axle, said vehicle energy absorbing system comprising:

an expandable air bag mechanically coupled to the frame and the axle;

a distance indicator for indicating a vertical distance between the frame and the axle attached to the vehicle;

an air bag pressure control valve in fluid communication with said air bag and operable with said distance indicator; and a source of air under pressure attached to the vehicle and in fluid communication with said air bag pressure control valve, whereby when said distance indicator indicates a first vertical distance between the frame and the axle, said valve is positioned in a first position supplying air from said source of air to said air bag at a first air pressure and when said distance indicator indicates a second vertical distance between the frame and the axle, said valve is positioned in a second position supplying air from said source of air to said air bag at a second air pressure and whereby said air bag insignificantly affects the distance between the frame and the axle while significantly affecting the smoothness of the ride of the vehicle.

2. The vehicle energy absorbing system as claimed in claim 1 wherein said air bag pressure control valve is a pilot valve mechanically and operatively connected to said distance indicator.

3. The vehicle energy absorbing system as claimed in claim 1 wherein said distance indicator includes a spring operable between the frame and the axle.

4. The vehicle energy absorbing system as claimed in claim 1 wherein said distance indicator includes a base; a guiding member attached to said base; a guided member having a leg member and a top member, said leg slideably received by said guiding member, and a spring sandwiched between said base and said top member of said guided member so that said guided member is adapted to move in the vertical direction relative to said base.

5. The vehicle energy absorbing system of claim 1 including a control panel connected to the vehicle, said control panel including a pre-set high pressure regulator and a pre-set low pressure regulator, each of said regulators adapted to control said control valve under predetermined conditions.

6. A kit for modifying a vehicle having a suspension system, the vehicle having a frame and an axle, and a source of air pressure, wherein the frame is spaced apart from the axle arrangement in vertical direction, the suspension system mechanically coupling the frame to the axle arrangement, said kit comprising:

an expandable air bag adapted to be coupled to the frame and to the axle and to the source of air pressure;

a distance indicator for indicating a vertical distance between the frame and the axle adapted to be attached to the vehicle; and an air bag pressure control valve adapted to be in fluid communication with said air bag and coupled to said distance indicator, whereby when said distance indicator indicates a first distance between the frame and the axle, said valve is adapted to be positioned in a first position to supply air from said source of air to said air bag at a first air pressure and when said distance indicator indicates a second distance between the frame and the axle, said valve is adapted to be positioned in a second position and to supply air from said source of air to said air bag at a second air pressure and whereby said air bag is adapted to insignificantly affect the distance between the frame and the axle while significantly affecting the smoothness of the ride of the vehicle.

7. The kit as claimed in claim 6 wherein said distance indicator includes a base, a guiding member attached to said base, a guided member having a leg member and a top member, said leg adapted to be slideably received by said guiding member, and a spring adapted to be sandwiched between said base and said top member of said guided member, and said air bag pressure control valve is a pilot valve having a wheel mounted to an arm, said wheel adapted to rest on said top member of the guiding member.

8. A vehicle energy absorbing system for a vehicle having a suspension system, a frame and an axle, wherein the frame is spaced apart from the axle in a vertical direction and the suspension system mechanically couples the frame to the axle, said vehicle energy absorbing system comprising:

an expandable air bag mechanically coupled to the frame and the axle;

a distance indicator for indicating a vertical distance between the frame and the axle attached to the vehicle wherein said distance indicator comprises a base, a guiding member attached to said base, a guided member having a leg member and a top member, said leg slideably received by said guiding member, and a spring sandwiched between said base and said top member of said guided member so that said guided member is adapted to move in the vertical direction relative to said base;

an air bag pressure control valve in fluid communication with said air bag and operable with said distance indicator; and a source of air under pressure attached to the vehicle and in fluid communication with said air bag pressure control valve, wherein when said distance indicator indicates a first vertical distance between the frame and the axle, said valve is positioned in a first position supplying air from said source of air to said air bag at a first air pressure and when said distance indicator indicates a second vertical distance between the frame and the axle, said valve is positioned in a second position supplying air from said source of air to said air bag at a second air pressure.

9. The vehicle energy absorbing system of claim 8 wherein said guiding member includes at least a first set of two rollers attached to said base, said rollers spaced a horizontal distance apart wherein said guided member leg is slideably received by said guiding member between said rollers.

10. The vehicle energy absorbing system of claim 9 wherein said guiding member includes a second set of rollers also having two rollers attached to said base, said rollers in said second set spaced a second horizontal distance apart, wherein said guided member further includes a second leg depending from said top member and is U-shaped, said second leg slideably received by said guiding member between said rollers of said second set.

11. The vehicle energy absorbing system of claim 8 further comprising a stop member attached to said guided member.

12. The vehicle energy absorbing system of claim 11 wherein said stop member is attached to said leg, said stop member includes a block having a hole and a screw having a head, said screw is received by said block hole, said leg has an adjusting hole through which said screw passes and said leg is sandwiched between said block and said screw head.

13. The vehicle energy absorbing system of claim 12 wherein said leg has a plurality of adjusting holes in the vertical direction adapted to receive said stop and adjust the maximum distance of said top member with respect to said base.

14. The vehicle energy absorbing system of claim 8 wherein said spring is attached to said base and said top member.

15. The vehicle energy absorbing system as claimed in claim 8 wherein said air bag pressure control valve is a pilot valve mechanically and operatively connected to said distance indicator.

16. The vehicle energy absorbing system as claimed in claim 15 wherein said pilot valve rests on said top member of said guided member.

17. The vehicle energy absorbing system as claimed in claim 16 wherein said pilot valve includes a wheel mounted to an arm, said wheel resting on said top member of the guided member.

18. The vehicle energy absorbing system of claim 17 wherein said pilot valve is a two-position pilot valve and said pilot valve further includes a high pressure inlet port, a low pressure inlet port, an outlet port fluidly coupled to said air bag and a spring actuated valve member attached to said arm whereby when said top member is greater than or equal to a first distance from said base, said spring actuated valve member is in a first position fluidly coupling said low pressure inlet port to said outlet port and blocking said high pressure inlet port from said outlet port and when said top member is less than a second distance from said base, said spring actuated valve member is in a second position fluidly coupling said high pressure inlet port to said outlet port and blocking said low pressure inlet port from said outlet port.

19. The vehicle energy absorbing system of claim 18 further comprising a pressure regulator having an inlet port in fluid communication with said air source, a high pressure exit port in fluid communication with said pilot valve high pressure inlet port and a low pressure exit port in fluid communication with said pilot valve low pressure inlet port.

20. A kit for modifying a vehicle having a suspension system, the vehicle having a frame and an axle, and a source of air pressure, wherein the frame is spaced apart from the axle arrangement in a vertical direction, the suspension system mechanically coupling the frame to the axle arrangement, said kit comprising:

an expandable air bag adapted to be coupled to the frame and to the axle and to the source of air pressure;

a distance indicator for indicating a vertical distance between the frame and the axle adapted to be attached to the vehicle wherein said distance indicator includes a base, a guiding member attached to said base, a guided member having a leg member and a top member, said leg adapted to be slideably received by said guiding member, and a spring adapted to be sandwiched between said base and said top member of said guided member so that said guided member is adapted to move in the vertical direction relative to said base; and an air bag pressure control valve adapted to be in fluid communication with said air bag and coupled to said distance indicator, whereby when said distance indicator indicates a first distance between the frame and the axle, said valve is adapted to be positioned in a first position to supply air from said source of air to said air bag at a first air pressure and when said distance indicator indicates a second distance between the frame and the axle, said valve is adapted to be positioned in a second position and to supply air from said source of air to said air bag at a second air pressure.

21. A kit as claimed in claim 20 wherein said air bag pressure control valve is a pilot valve having a wheel mounted to an arm, said wheel adapted to rest on said top member of the guided member.

22. A vehicle energy absorbing system for a vehicle having a suspension system, a frame and an axle, wherein the frame is spaced apart from the axle in a vertical direction and the suspension system mechanically couples the frame to the axle, said vehicle energy absorbing system comprising:

an expandable air bag mechanically coupled to the frame and the axle;

a distance indicator for indicating a vertical distance between the frame and the axle attached to the vehicle;

an air bag pressure control valve in fluid communication with said air bag and operable with said distance indicator; and a source of air under pressure attached to the vehicle and in fluid communication with said air bag pressure control valve, wherein when said distance indicator indicates a first vertical distance between the frame and the axle, said valve is positioned in a first position supplying air from said source of air to said air bag at a first air pressure and inflating said air bag to the first air pressure and when said distance indicator indicates a second vertical distance between the frame and the axle, said valve is positioned in a second position supplying air from said source of air to said air bag at a second air pressure and inflating said air bag to the second air pressure.

* * * * *